Patented Feb. 19, 1924.

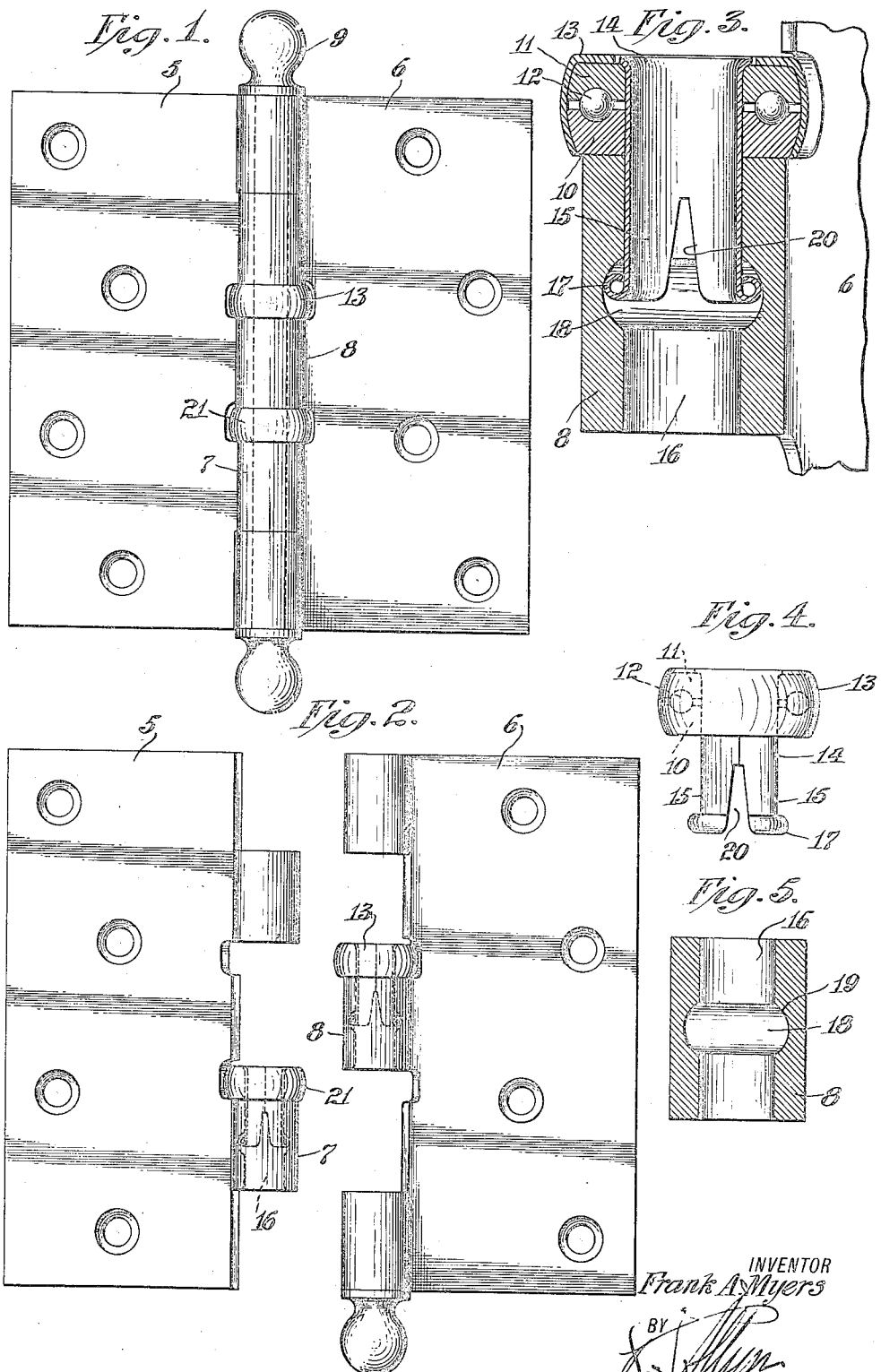

1,484,610

UNITED STATES PATENT OFFICE.

FRANK A. MYERS, OF PLAINVILLE, CONNECTICUT, ASSIGNOR TO THE STANLEY WORKS, OF NEW BRITAIN, CONNECTICUT, A CORPORATION OF CONNECTICUT.

BUTT HINGE.

Original application filed December 12, 1919, Serial No. 344,276. Patent No. 1,409,461. Divided and this application filed February 17, 1923. Serial No. 619,603.

*To all whom it may concern:*

Be it known that I, FRANK A. MYERS, a citizen of the United States of America, residing at Plainville, Hartford County, Connecticut, have invented a new and useful Butt Hinge, of which the following is a specification.

My invention relates particularly to what are commonly termed "ball bearing hinges" and the present application is a division from #344,276, filed December 12, 1919, now Patent #1,409,461. In the former case I have broadly claimed a hinge in which a protected ball bearing is secured in place on a knuckle of the hinge and specifically claimed a pair of ball bearings held in place on opposite ends of a knuckle.

This present application has for its main object the more specific protection of the invention described in my former case and illustrated in Figure 4 of said Patent #1,409,461. In this construction the ball bearing unit is secured adequately in place so that the hinge may be handled without danger of losing or displacing the bearing unit but yet the bearing unit may be detached when desired for the purpose of inspection, repair, or renewal.

The particular form of construction illustrated employs one or more spring fingers with flanges engaging in a recess for detachably and resiliently securing the bearing unit in place.

Figure 1 is a front view of one form of assembled construction embodying the improvements of my present invention.

Fig. 2 is a front view showing the parts of the hinge separated and omitting the pintle.

Fig. 3 is an enlarged vertical sectional view showing the ball bearing and one method of attachment.

Fig. 4 is a detail side view of one of the bear units.

Fig. 5 is a separate vertical sectional view of one of the knuckles adapted to receive the ball bearing unit of Fig. 4.

The hinge leaves 5 and 6 may be provided with any suitable number of knuckles such as 7 and 8, and the parts may be secured together by any suitable form of pintle 9.

The anti-friction or ball bearing unit shown assembled in Fig. 4 and shown in section in Fig. 3 has two washer like ball races 10 and 11 with anti-friction members such as the balls 12 between them. These washers or ball races are held together and protected by a casing consisting preferably of the two parts 13 and 14. This casing is preferably formed of non-corrosive sheet metal spun, drawn, or otherwise formed to the desired shape. The parts are sufficiently loosely connected so that one or the other of the ball races is free to turn with respect to the other. The outer part of the casing or housing is preferably finished to give a neat and pleasing appearance. The parts are so constructed and proportioned that they protrude but little laterally of the knuckles and so as to bring the balls into a position to afford the maximum support with a minimum possibility of distortion of the ball races and knuckles.

The inner part 14 of the housing or casing has an extension adapted to the inside of one of the knuckles. In the form shown this extension has two spring fingers 15 within the bore 16 of the knuckle 8. The lower end of the tubular member 14 is provided with an outwardly extending flange or bead 17 which fits within the groove or recess 18 of the knuckle. It will be obvious with respect to Fig. 3 that the bearing unit cannot be withdrawn from the knuckle except by disengaging the flange 17 from the groove 18. This, of course, can be accomplished by the use of a suitable tool. I prefer, however, to form the groove 18 with an inclined shoulder 19 so that it is possible to automatically disengage the flange 17 by simply pushing or pulling the bearing unit vertically so that the flanges 17 will automatically be forced inward along the inclined shoulder 19 and thus disengaged. I have formed the spring finger 15 by simply slotting or splitting at 20 the tubular lining 14, but it will be obvious that this might be accomplished in many other ways.

It will be obvious that any of the knuckles of the hinge may be provided with bearing units such as described, but in this case I have only illustrated two bearing units, one attached to the knuckle 8 and another unit 21 attached to the knuckle 7. Obviously, either leaf of such a hinge may be attached to the door and still secure adequate anti-frictional support.

The construction as herein shown is of particular advantage in that it not only may be economically manufactured and easily assembled, but there is no danger of the bearings being lost or misplaced or assembled wrong side up as is possible with the ordinary loose type of ball bearing employed prior to my invention. This construction also permits of a maximum size of bearing for a given size hinge knuckle without requiring unsightly or awkward projections. As the ball races are arranged entirely outside of the knuckles it is not necessary to weaken the knuckles by cutting grooves as has been done in some constructions.

A carpenter may take the leaves apart for the purpose of attaching them to a door frame and door without danger of misplacing or losing the parts, but on the other hand in the form of construction herein shown it is comparatively easy to detach the bearing units when necessary for the purpose of repair or replacement.

I wish it understood that the terms of the claims are to be construed as descriptive rather than in limitation, except as required by the prior art. It should be understood, however, that although modifications may be made, the connection between the bearing unit and the knuckle or hinge leaf should be sufficiently positive to prevent the bearing unit from being accidently dislodged or dropped off in the ordinary handling and erection of the hinge. Where spring fingers are employed for holding the bearing unit in place they should be strong enough to require some substantial force in disengaging them.

I prefer to enclose the outer and inner edges of the ball races substantially as shown so as to prevent water and dirt from working in and corroding or clogging the ball bearing and interfering with the proper freedom of action.

I claim:

1. A hinge comprising leaves having interfitting knuckles and an anti-friction device consisting of bearing washers with interposed anti-friction members and spring means for detachably securing said device to one leaf.

2. A hinge comprising leaves having co-operating knuckles and an anti-friction device between adjacent knuckles consisting of bearing washers, bearing members between said washers, a casing connecting the outer edges of said washers, and a tubular lining having a spring finger detachably securing said device to one knuckle.

3. A hinge comprising leaves having co-operating knuckles, an anti-friction device comprising bearing washers and bearing members between said washers, and a tubular lining having an extension split to provide spring fingers for detachably securing said device in place.

4. A hinge comprising means having co-operating knuckles with a groove in one knuckle and an anti-friction device comprising washers between adjacent knuckles, bearings between said washers, and a casing for said washers having a finger detachably engaged in said groove.

5. A hinge comprising leaves having co-operating knuckles, one of which has a recess and a shoulder at one edge thereof, a ball bearing arranged on said knuckle having a flange with a detachable interlocking engagement with said shoulder in said recess.

6. A hinge comprising leaves having co-operating knuckles, an anti-friction device between adjacent knuckles having stationary and rotatable parts, the stationary part having a resilient member detachably secured to one of said knuckles, and means for automatically disengaging said member when said device is forcibly separated from said knuckle.

7. A hinge comprising leaves having co-operating knuckle members, a ball bearing member supported on one knuckle member, and movable means carried by one of the two last mentioned members and detachably engaging the other member for securing said bearing member in place.

8. A hinge comprising leaves having co-operating knuckles, a ball bearing member supported on one knuckle member and a spring finger carried by one of said last mentioned members and detachably engaging the other member to hold said bearing member in place.

9. A hinge comprising leaves having interfitting knuckles, a ball bearing member between adjacent knuckles having a casing enclosing the same, one knuckle having a groove and said casing having a spring finger engaging in said groove.

10. A hinge comprising leaves having interfitting knuckles, a ball bearing unit including bearing washers, ball bearings between said washers, a casing having an outer part and an inner tube, one of said knuckles having a groove and said tube having a flange fitting in said groove.

11. A hinge comprising a pair of leaves with co-operating knuckles, a ball bearing unit arranged between adjacent knuckles, one of said knuckles having a recess with an inclined entrance shoulder, said ball bearing having a yielding member with a projection in said recess adapted to frictionally engage said shoulder to retract said member when said bearing is being removed.

12. A hinge comprising leaves having interfitting knuckles, an anti-friction device between adjacent knuckles comprising bearing washers, bearings between said washers, a casing covering adjacent edges of said washers and having a spring member detachably securing said device to a knuckle.

13. A hinge comprising leaves having interfitting knuckles with a pintle passage, one of said knuckles having a groove, an anti-friction device arrangement between adjacent knuckles comprising bearing washers, bearings between said washers, and a casing for said washers having a part extending into said groove for holding said device to said knuckle.

14. A hinge comprising leaves having co-operating knuckles with a pintle passage, one of said knuckles having a groove, an anti-friction device supported on said knuckle comprising bearing washers, bearings between said washers and a casing for said washers having a flange fitting in said groove.

15. A hinge comprising leaves having interfitting knuckles, a connecting pintle, and an anti-friction device between adjacent knuckles and consisting of bearing washers with interposed anti-friction members, and a casing having an outer part embracing the outer edges of said washers and an inner part covering the inner edges of said washers, one of said parts having a portion extending into and terminating within an adjacent knuckle alongside of the pintle, said anti-friction device and one of said leaves having interengaging shoulders to prevent the accidental detachment of said anti-friction device when said leaves are separated.

FRANK A. MYERS.